(12) United States Patent
Takahashi

(10) Patent No.: US 10,187,541 B2
(45) Date of Patent: Jan. 22, 2019

(54) IMAGE READING APPARATUS AND IMAGE FORMING APPARATUS

(71) Applicant: CANON KABUSHIKI KAISHA, Tokyo (JP)

(72) Inventor: Toshio Takahashi, Toda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/723,882

(22) Filed: Oct. 3, 2017

(65) Prior Publication Data

US 2018/0109695 A1  Apr. 19, 2018

(30) Foreign Application Priority Data

Oct. 13, 2016  (JP) ................. 2016-201923

(51) Int. Cl.
*F21V 8/00* (2006.01)
*H04N 1/195* (2006.01)
*G03G 15/22* (2006.01)

(52) U.S. Cl.
CPC ......... *H04N 1/19589* (2013.01); *G02B 6/009* (2013.01); *G02B 6/0046* (2013.01); *G02B 6/0083* (2013.01); *G02B 6/0088* (2013.01); *G03G 15/22* (2013.01); *H04N 2201/0081* (2013.01); *H04N 2201/0082* (2013.01)

(58) Field of Classification Search
CPC ....... H04N 1/19589; H04N 2201/0081; H04N 2201/0082; G02B 6/0083; G02B 6/0046; G02B 6/0088; G02B 6/009; G03G 15/22
USPC .......................................................... 399/4
See application file for complete search history.

(56) References Cited

U.S. PATENT DOCUMENTS

| 5,917,620 | A | 6/1999 | Hasegawa et al. ............ 358/513 |
| 5,936,223 | A | 8/1999 | Suzuki et al. ............ 235/462.01 |
| 6,631,014 | B1 | 10/2003 | Aoshima et al. ............. 358/497 |
| 6,717,702 | B1 | 4/2004 | Yamauchi et al. ............ 358/497 |
| 7,692,827 | B2 | 4/2010 | Sugiyama et al. ............ 358/497 |
| 7,717,598 | B2 * | 5/2010 | Kakizaki .............. G02B 6/0018 250/227.11 |
| 7,742,203 | B2 | 6/2010 | Sugiyama et al. ............ 358/497 |
| 8,422,093 | B2 | 4/2013 | Ishida ........................... 358/475 |
| 8,643,917 | B2 | 2/2014 | Ishida ........................... 358/475 |

(Continued)

FOREIGN PATENT DOCUMENTS

| JP | 2010-217418 | 9/2010 |
| JP | 2016-134745 | 7/2016 |

*Primary Examiner* — Susan S Lee
(74) *Attorney, Agent, or Firm* — Venable LLP

(57) ABSTRACT

An image reading apparatus includes a light guide including a light guide portion configured to guide light emitted from a plurality of light sources, a deflection portion configured to deflect and emit light guided by the light guide portion, and a projection portion. The light guide portion includes a first surface and a second surface configured to internally reflect the light from the light sources. At least one of the first surface and the second surface includes a concave portion positioned to cover the projection portion in the arrangement direction. In a plane passing through the concave portion and parallel to the arrangement direction, a distance between the first surface and the second surface in a portion where the concave portion is formed is smaller than a distance between the first surface and the second surface in a portion where the concave portion is not formed.

10 Claims, 12 Drawing Sheets

(56) References Cited

U.S. PATENT DOCUMENTS

| | | | |
|---|---|---|---|
| 8,798,500 B2 | 8/2014 | Shinkawa | 399/118 |
| 8,876,355 B2 * | 11/2014 | Nomoto | G02B 6/002 358/475 |
| 2013/0222866 A1 * | 8/2013 | Sugiyama | H04N 1/0285 358/497 |
| 2016/0269582 A1 | 9/2016 | Takahashi | H04N 1/0289 |

* cited by examiner

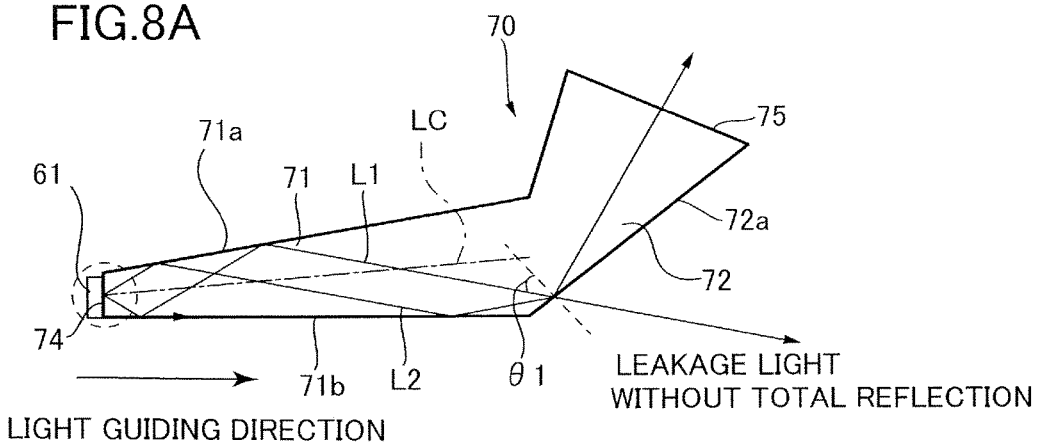
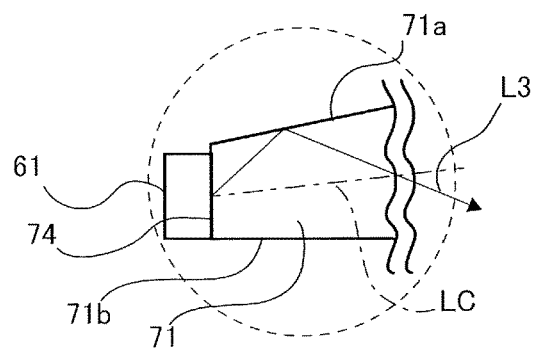
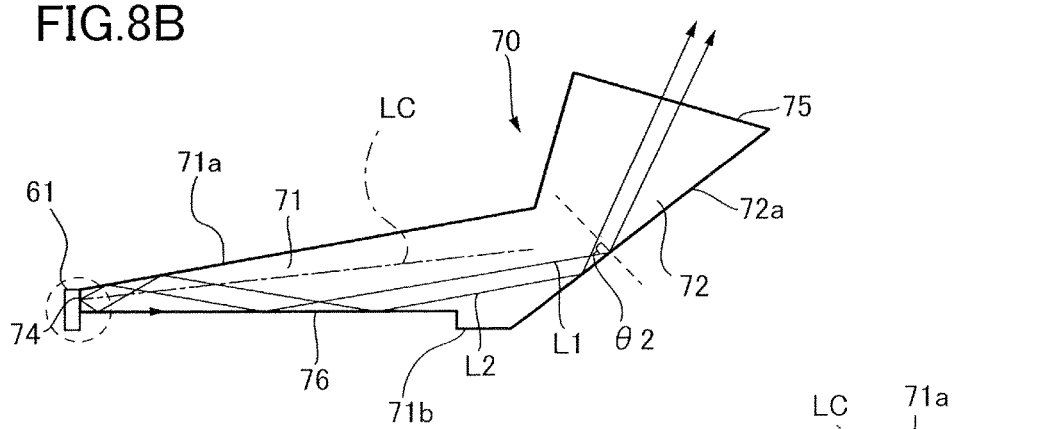
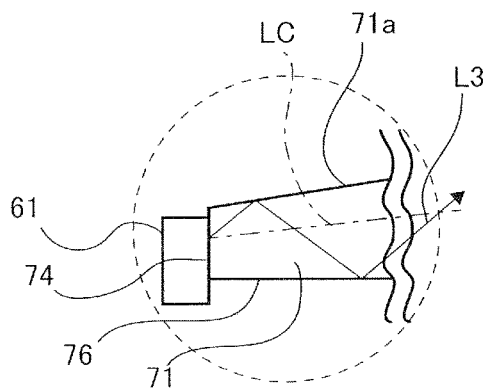

IMAGE READING APPARATUS AND IMAGE FORMING APPARATUS

BACKGROUND OF THE INVENTION

Field of the Invention

The present invention relates to an image reading apparatus for reading images of sheets, and an image forming apparatus including the image reading apparatus.

Description of the Related Art

In general, image forming apparatuses, such as copying machines and facsimiles, include an image reading apparatus for optically reading images of documents. A known image reading apparatus includes an illumination apparatus in which a plurality of LEDs (point sources) are linearly arranged to illuminate documents. The illumination apparatus, which includes the plurality of LEDs serving as the point sources, also includes a light guide between a document surface and the LEDs to prevent uneven distribution in illumination on a document surface in an LED arrangement direction. The light guide is made of material such as transparent resin or glass. The light guide guides light beams from the LEDs, each of which light beams spreads with its circular cross section, toward the document surface so that the light beams illuminate the document surface in a main scanning direction (LED arrangement direction) in document reading.

For example, there has been proposed an illumination apparatus in which such a light guide is positioned on a receiving base with positioning pins which are integrally formed in the light guide, as disclosed in Japanese Patent Application Publication No. 2010-217418. The light guide is commonly injection-molded by using a mirror-finished mold, and thus the surface of the light guide is formed like a mirror surface. However, because portions of the light guide where the positioning pins are formed cannot be mirror-finished, the surfaces of the positioning pins cannot be formed like a mirror surface. For this reason, the light incident on the positioning pins partly leaks from the positioning pins to the outside, greater than the other portion of the light guide, without internally reflecting off the positioning pins. As a result, significantly uneven distribution in illumination may be produced in the main scanning direction of the document surface. The uneven distribution may cause, for example, stripes of image, and reduce image quality.

Thus, the illumination apparatus described in Japanese Patent Application Publication No. 2010-217418 minimizes the leakage light from the positioning pins, with the positioning pins each disposed in a portion which is between adjacent LEDs and has less light flux from the LEDs. This illumination apparatus, however, has a restriction in which the distance between the adjacent LEDs must be larger than the diameter of each of the positioning pins. Thus, the arrangement of the positioning pins and the LEDs are greatly restricted.

SUMMARY OF THE INVENTION

According to a first aspect of the present invention, an image reading apparatus includes a board on which a plurality of light sources are arranged, a light guide including a light guide portion configured to guide light emitted from the plurality of light sources, in an intersecting direction intersecting with an arrangement direction of the plurality of light sources, the light guide portion including a first surface and a second surface facing each other and configured to internally reflect the light from the light sources, the first surface and the second surface being formed such that a distance between the first surface and the second surface increases as the first surface and the second surface extend away from the light sources, a deflection portion configured to deflect and emit light guided by the light guide portion, and a projection portion projecting outward from the first surface, and an image reading portion configured to perform photoelectric conversion on reflected light reflected by a sheet which has received the light emitted from the deflection portion of the light guide, and to read image information. The light guide portion, the deflection portion, and the projection portion are integrally formed. At least one of the first surface and the second surface includes a concave portion positioned to cover the projection portion in the arrangement direction. In a plane passing through the concave portion and parallel to the arrangement direction, a distance between the first surface and the second surface in a portion where the concave portion is formed is smaller than a distance between the first surface and the second surface in a portion where the concave portion is not formed.

According to a second aspect of the present invention, an image reading apparatus includes a board on which a plurality of light sources are arranged, a light guide including a light guide portion configured to guide light emitted from the plurality of light sources, in an intersecting direction intersecting with an arrangement direction of the plurality of light sources, the light guide portion comprising a first surface and a second surface facing each other and configured to internally reflect the light from the light sources, the first surface and the second surface being formed such that a distance between the first surface and the second surface increases as the first surface and the second surface extend away from the light sources, a deflection portion configured to deflect and emit light guided by the light guide portion, and a projection portion projecting outward from the first surface, and an image reading portion configured to perform photoelectric conversion on reflected light reflected by a sheet which has received the light emitted from the deflection portion of the light guide, and to read image information. The light guide portion, the deflection portion, and the projection portion are integrally formed. In a plane parallel to the arrangement direction and orthogonal to the intersecting direction, a distance between the first surface and the second surface in a position of a portion which covers the projection portion in the arrangement direction is smaller than a distance between the first surface and the second surface in a position of a portion which does not cover the projection portion in the arrangement direction.

Further features of the present invention will become apparent from the following description of exemplary embodiments with reference to the attached drawings.

BRIEF DESCRIPTION OF THE DRAWINGS

FIG. 8A is a cross-sectional view illustrating a portion of a light guide in which the pin and the concave portion are not formed.

FIG. 8B is a cross-sectional view illustrating a portion of the light guide in which the pin and the concave portion are formed.

FIG. 8C is an enlarged view illustrating a broken line portion of FIG. 8A.

FIG. 8D is an enlarged view illustrating a broken line portion of FIG. 8B.

DESCRIPTION OF THE EMBODIMENTS

First Embodiment

Hereinafter, an image reading apparatus and an image forming apparatus of the present invention will be described with reference to the accompanying drawings. The scope of this technique, however, is not intended to be limited to the size, material, shape, and relative arrangement of components described in the following embodiments, unless otherwise specified.

Schematic Configuration of Printer

Figure 1:
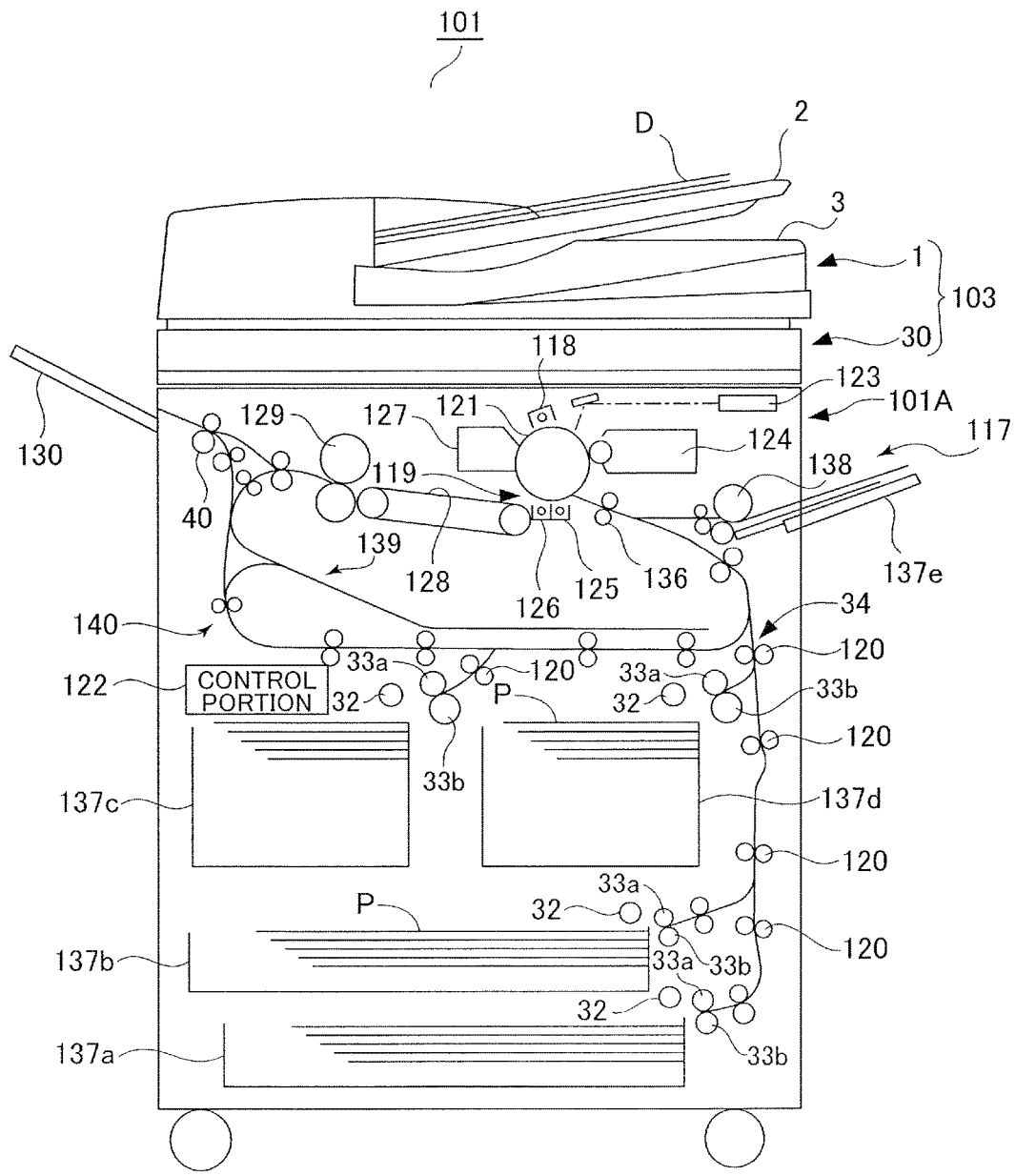
FIG. 1 is an overall schematic diagram of a printer of a first embodiment.

First, a schematic configuration of a printer 101 that serves as an image forming apparatus will be described with reference to FIG. 1. As illustrated in FIG. 1, the printer 101 includes a printer body 101A and an image reading apparatus 103. The image reading apparatus 103, which is disposed on the printer body 101A, includes a later-described reading unit 30 and an automatic document feeder (ADF) 1. The image reading apparatus 103 optically scans a document D to read image information of the document D. The document D is a sheet, such as a sheet of paper, an envelope, a plastic film such as an overhead transparency (OHT), or a cloth sheet. The image information is converted into an electrical signal by the image reading apparatus 103, and sent to a control portion 122 of the printer body 101A.

The printer body 101A includes an image forming portion 119 which forms an image on a sheet P used as a record medium, a sheet feeding portion 34 which feeds the sheet P to the image forming portion 119, and a manual feeding portion 117. The sheet feeding portion 34 includes sheet storing portions 137a, 137b, 137c, and 137d which store sheets having different sizes. The sheet P stored in the sheet storing portions is fed by a pickup roller 32, separated, one by one, by a feed roller 33a and a retard roller 33b, and received by a corresponding conveyance roller pair 120. The sheet P is then sequentially received by other conveyance roller pairs 120 disposed along a sheet conveyance path, and then conveyed to a registration roller pair 136.

On the other hand, the sheet P placed on a manual feed tray 137e of the manual feeding portion 117 by a user is fed to the interior of the printer body 101A by a feeding roller 138, and conveyed to the registration roller pair 136. The registration roller pair 136 stops the leading edge of the sheet P and corrects the skew of the sheet P, and conveys the sheet P again in synchronization with an image formation, which is a toner-image forming process performed by the image forming portion 119.

The image forming portion 119, which forms an image on the sheet P, is an electrophotographic unit including a photosensitive drum 121 which is made of a photosensitive material. The photosensitive drum 121 rotates in a direction in which the sheet P is conveyed. Around the photosensitive drum 121, a charger 118, an exposing unit 123, a developing unit 124, a transfer charger 125, a separation charger 126, and a cleaner 127 are disposed. The charger 118 charges the surface of the photosensitive drum 121 uniformly. The exposing unit 123 exposes the photosensitive drum 121 in accordance with image information data inputted from the image reading apparatus 103, and forms an electrostatic latent image on the photosensitive drum 121.

The developing unit 124 stores two-component developer which contains toner and carrier, and supplies electrically charged toner onto the photosensitive drum 121 to develop the electrostatic latent image into a toner image. The toner image carried by the photosensitive drum 121 is transferred onto the sheet P conveyed from the registration roller pair 136, by bias electric field generated by the transfer charger 125. The sheet P on which the toner image is transferred is separated from the photosensitive drum 121 by bias electric field generated by the separation charger 126, and conveyed toward a fixing portion 129 by a pre-fixation conveyance portion 128. The cleaner 127 removes sticking substance such as remaining toner, which has not been transferred onto the sheet P and is left on the photosensitive drum 121, for the next image forming operation by the photosensitive drum 121.

The sheet P conveyed to the fixing portion 129 is sandwiched by a roller pair, while pressed and heated by the roller pair, so that the toner image is fixed on the sheet P through the melting and fixing of the toner. When the image data has been completely outputted, the sheet P with the fixed image is discharged, through a discharge roller pair 40, to a discharge tray which projects toward the outside of the printer body 101A. In the case where an image is to be formed on the back side of the sheet P in duplex printing, the sheet P having passed through the fixing portion 129 is conveyed to a sheet inversion portion 139 where the sheet P is inverted, then conveyed to a duplex-printing conveyance portion 140, and then conveyed to the registration roller pair 136 by the duplex-printing conveyance portion 140. Then, the image is also formed on the sheet P by the image forming portion 119, and the sheet P is discharged to the discharge tray 130.

Image Reading Apparatus

Figure 2:
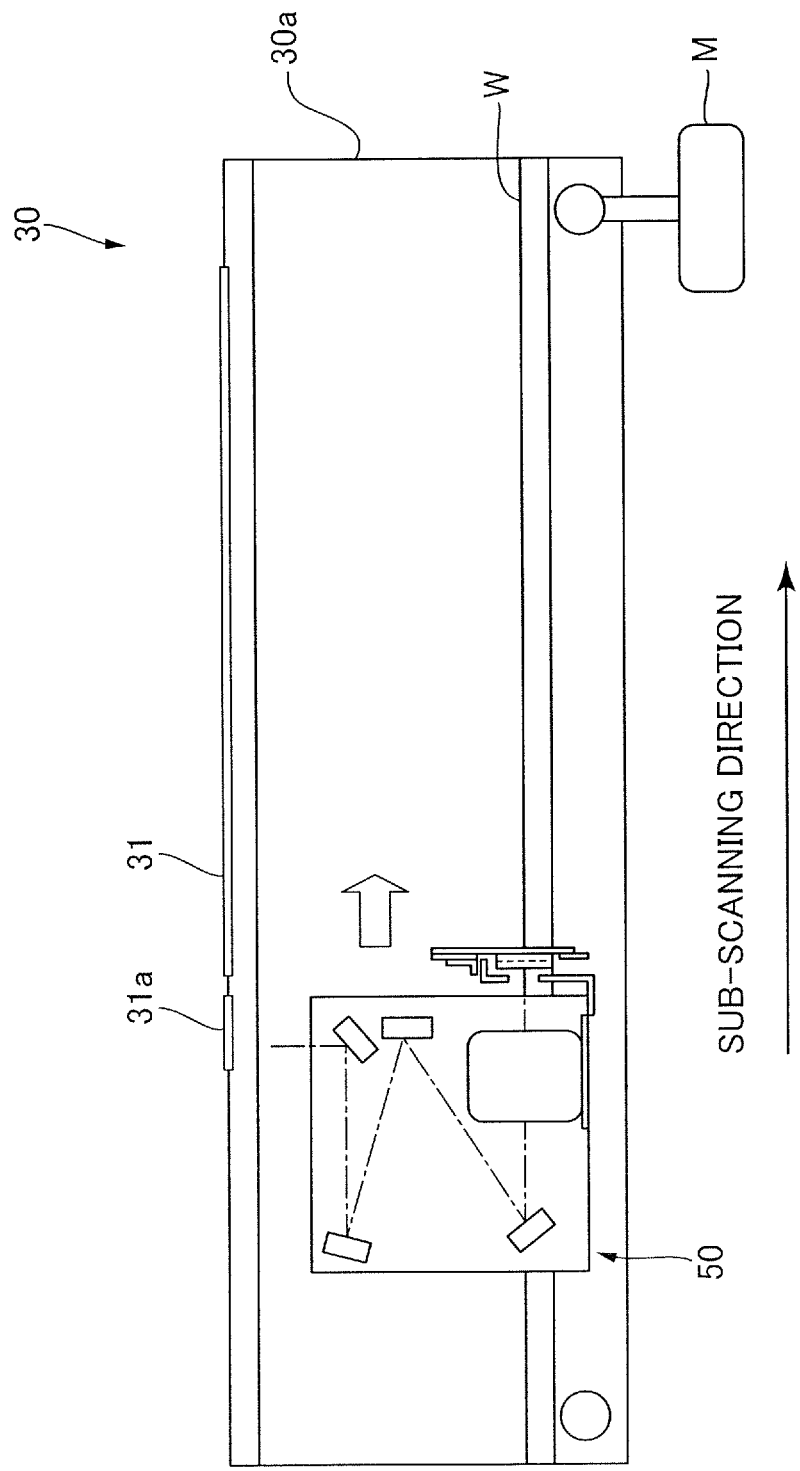
FIG. 2 is a schematic diagram of a reading unit.

Next, with reference to FIGS. 1, 2, and 3, a configuration of the image reading apparatus 103 will be described. As illustrated in FIG. 1, the ADF 1 conveys the document D placed on a document feeding tray 2 toward a document discharge tray 3. As illustrated in FIG. 2, the reading unit 30 has its exterior which is formed by a frame 30a. On the top surface of the frame 30a, a document glass and a platen glass 31a are disposed. The frame 30a contains a scanner unit 50 held therein. The scanner unit 50 can move parallel to the document glass 31, with a wire W driven by a motor M.

Figure 3:
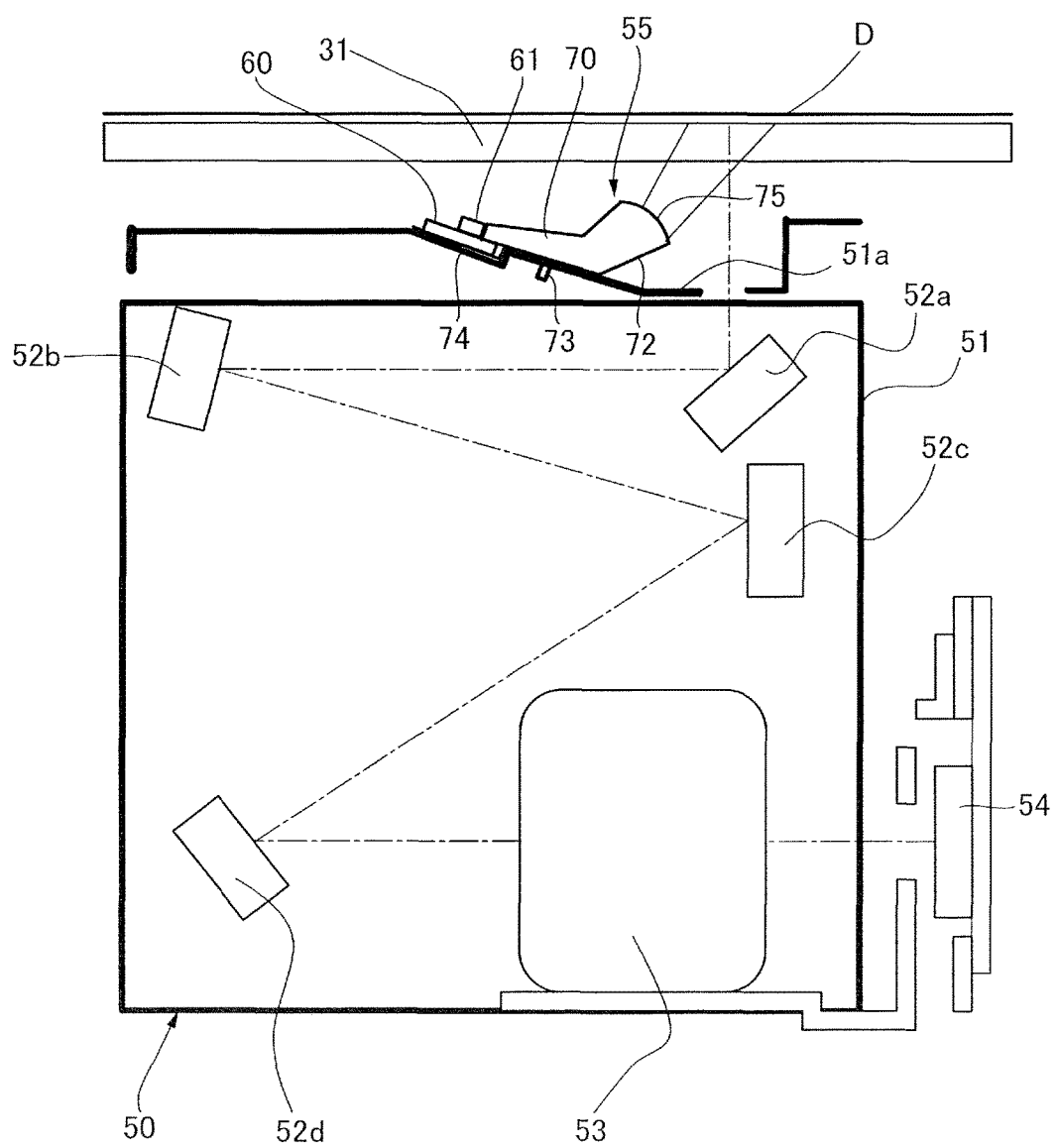
FIG. 3 is a schematic diagram of a scanner unit.

As illustrated in FIG. 3, the scanner unit 50 is a sensor unit using a charge coupled device (CCD). Specifically, the scanner unit 50 includes a box housing 51, an illumination unit 55 mounted on a top surface 51*a* of the box housing 51, mirrors 52*a*, 52*b*, 52*c*, and 52*d*, a lens unit 53, and a CCD 54.

The light emitted from the illumination unit 55 toward the document D is reflected by the document D. The light reflected by the document D travels via the mirrors 52*a*, 52*b*, 52*c*, and 52*d*, and the lens unit 53, and forms an image on the CCD 54. The CCD (image reading portion) 54 performs photoelectric conversion on the image formed by the reflected light, and outputs an electrical signal to the control portion 122. Thus, the electrical signal corresponds to an image of the image reading surface (lower surface) of the document D.

The image reading apparatus 103 configured in this manner reads image information from the document D, by using a flowing-document read mode or a fixed-document read mode. In the flowing-document read mode, the image of the document D is scanned while the document D is fed by the ADF 1. In the fixed-document read mode, the image of the document D is scanned in a state where the document D is placed on the document glass 31. The flowing-document read mode is selected when the image reading apparatus detects the document D which is placed on the document feeding tray 2, or when a user selects the flowing-document read mode by using, for example, an operation panel of the printer body 101A. In this case, the scanner unit 50 is positioned below the platen glass 31*a*, and the ADF 1 feeds the document D having placed on the document feeding tray 2, one by one. The scanner unit 50 illuminates the image reading surface of the document D through the platen glass 31*a*, while scanning the image reading surface. That is, the scanner unit 50 reads the image of the document D having placed on the document glass 31, while the document D is conveyed and scanned in a sub-scanning direction (right and left direction in FIG. 1).

On the other hand, the fixed-document read mode is selected when the image reading apparatus detects the document D having placed on the document glass 31, or when a user selects the fixed-document read mode by using, for example, the operation panel of the printer body 101A. In the fixed-document read mode, the user opens the ADF 1, then places the document D on the document glass 31, and then closes the ADF 1 to position the document D on the document glass 31. The scanner unit 50 illuminates the document reading surface of the document D having placed on the document glass 31, and scans the document D while moving along the document glass 31. Alternatively, a scanner unit for the flowing-document read mode and a scanner unit for the fixed-document read mode may be provided separate from each other.

Configuration of Illumination Unit

Figure 4:
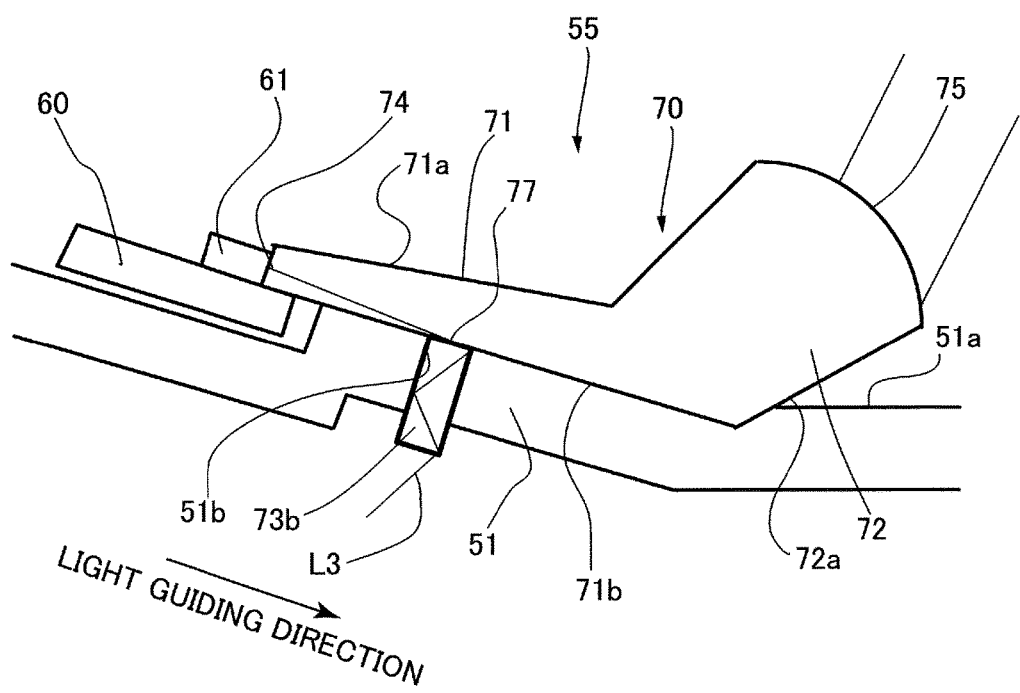
FIG. 4 is a schematic diagram of an illumination unit.

As illustrated in FIG. 4, the illumination unit 55 includes a light guide 70 and an LED board (or simply "board") 60. The LED board 60 is provided with a plurality of LEDs (light sources) 61 mounted thereon. The plurality of LEDs are arranged in a main scanning direction (arrangement direction) which is a longitudinal direction of the LED board 60. The plurality of LEDs 61 are supplied with electric power via a cable and connecters (not illustrated).

Figure 5A:
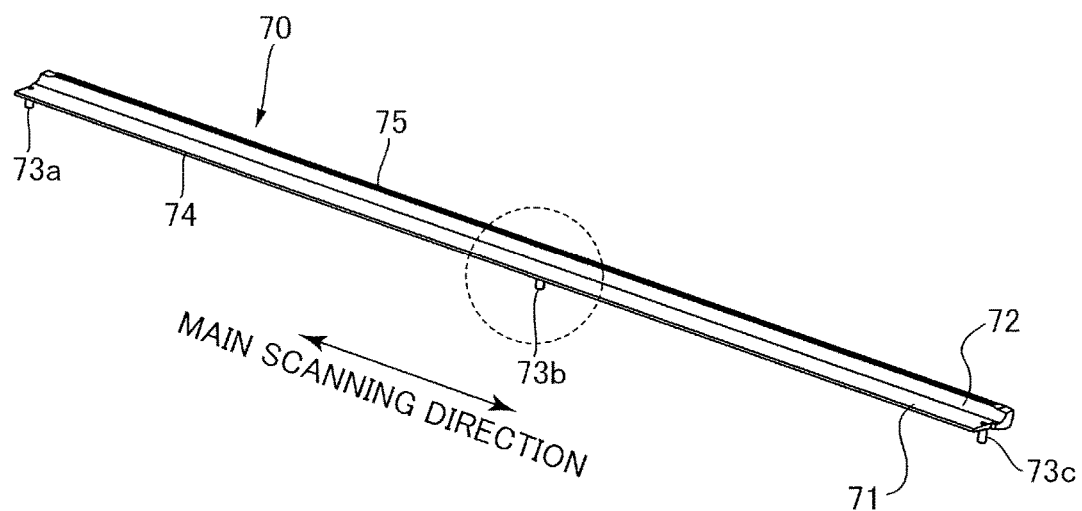
FIG. 5A is a perspective view of a light guide.

As illustrated in FIGS. 4 and 5A, the light guide is elongated in the main scanning direction, and includes a light guide portion 71 and a deflection portion 72. The light guide portion 71 guides the light emitted from the LEDs 61, toward a light guiding direction (intersecting direction) intersecting with the main scanning direction. In the present embodiment, the light guiding direction is a orthogonal direction orthogonal to the main scanning direction. The deflection portion 72 deflects the light guided by the light guide portion 71. The light guide 70 is injection-molded by using a material such as acrylic resin, and is constituted by the light guide portion 71, the deflection portion 72, and later-described pins 73*a*, 73*b*, and 73*c*, which are integrally formed. The light guide portion 71 includes an upper surface 71*a* (second surface) and a lower surface 71*b* (first surface). The upper surface 71*a* and the lower surface 71*b* face each other, and constitute a wedge shape such that, as the upper surface 71*a* and the lower surface 71*b* extend away from the plurality of LEDs 61, these surfaces are more separated from each other. The light guide portion 71 also includes an entrance surface 74, which is continuous with the upper surface 71*a* and the lower surface 71*b*, and through which the light from the plurality of LEDs enters the light guide 70.

The pins 73*a*, 73*b*, and 73*c* (projection portions) project outward from the lower surface 71*b* in a direction orthogonal to the lower surface 71*b*. The pins 73*a*, 73*b*, 73*c* are arranged at predetermined intervals in the main scanning direction. Specifically, the pins 73*a* and 73*c* are arranged at both ends of the lower surface 71*b* in the main scanning direction, and the pin 73*b* is arranged at a center of the lower surface 71*b* in the main scanning direction. The pins 73*a*, 73*b*, and 73*c* engage with three engagement holes 51*b* of the box housing (supporting portion) 51, so that the light guide 70 is positioned with respect to the box housing 51. Because the pins 73*a*, 73*b*, and 73*c* have an identical structure and their surroundings are the same as each other, the following description will focus on the pin 73*b* and its surrounding, and the description of the other pins 73*a* and 73*c* and their surroundings will be omitted.

The deflection portion 72 is disposed downstream of the light guide portion 71 in the light guiding direction, and deflects the light, which is guided by the light guide portion 71, toward the document D by causing a deflection surface 72*a* to totally reflect the light. The light reflected by the deflection surface 72*a* is emitted to the document D from an exit surface 75 of the deflection portion 72. As shown in FIG. 4, the deflection surface 72*a* is a surface with which an extension line of the upper surface 71*a* and the lower surface 71*b* are respectively intersect at large angles.

In the light guide portion 71, the light having emitted from the plurality of LEDs 61, which serve as point sources, and having entered the light guide portion 71 through the entrance surface 74 is reflected more than one times between the upper surface 71*a* and the lower surface 71*b*, and evenly diffused in the main scanning direction. Thus, the document D can be illuminated with the light extending in the main scanning direction and formed like a line. The upper surface 71*a* and the lower surface 71*b* are formed like a mirror surface by using a mirror-finished mold, and by injection-molding the illumination unit 55.

Figure 6:
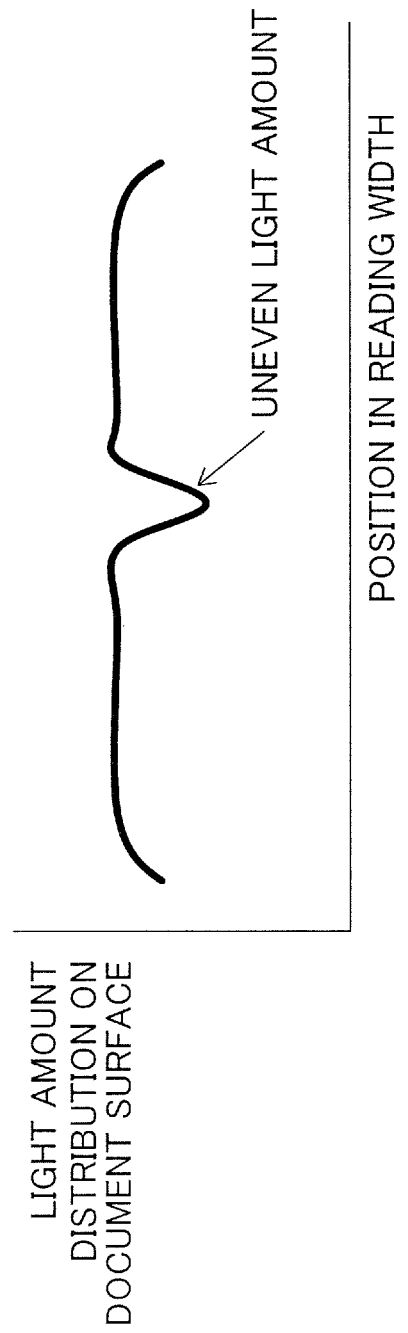
FIG. 6 is a graph illustrating uneven distribution in the amount of light from a light guide, which is a comparative example 1.

In this case, because a base end portion 77 of the pin 73*b* cannot be formed like a mirror surface, light L3 leaks to the outside of the light guide 70 from the base end portion 77, as illustrated in FIG. 4. For this reason, if no countermeasures are taken in the light guide, uneven distribution in the amount of light may be produced in a reading width of the document D in the main scanning direction, as illustrated in FIG. 6 where the light guide is a comparative example 1. This uneven distribution may reduce image quality.

Figure 7:
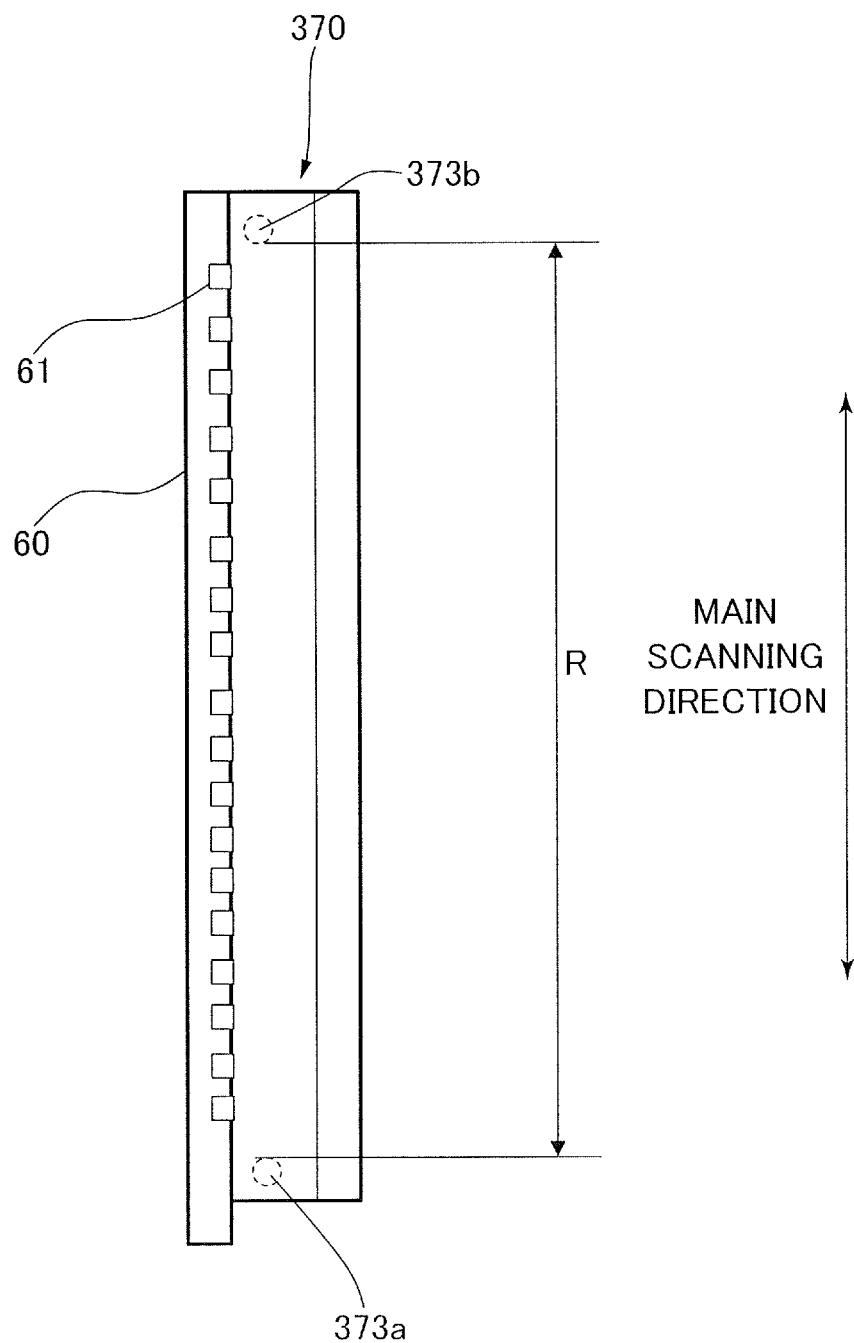
FIG. 7 is a plan view of a light guide which is a comparative example 2.

As another example, a light guide 370 can be conceived to prevent the uneven distribution in the amount of light, as illustrated in FIG. 7 where the light guide 370 is a comparative example 2. The light guide 370 has pins 373a and 373b provided outside a width R of the document D. This configuration, however, elongates the light guide 370 in the main scanning direction, and thus prevents downsizing of the apparatus.

Figure 5B:
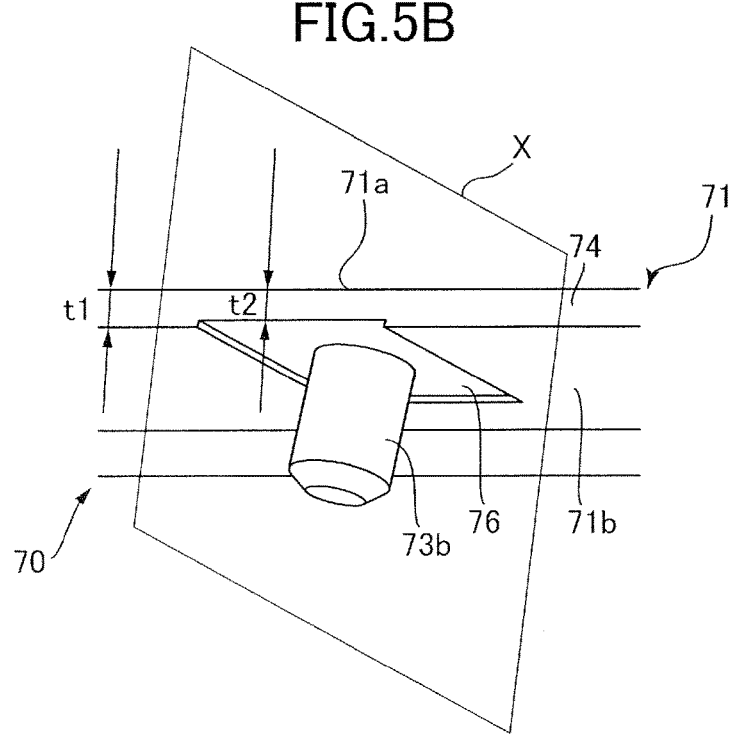
FIG. 5B is an enlarged perspective view of a pin and a concave portion.

In the present embodiment, as illustrated in FIG. 5B, concave portions 76 are formed in the lower surface 71b. The concave portions 76 are formed closer to the upper surface 71a than the other portion of the lower surface 71b. The concave portions 76 are arranged in the main scanning direction such that a corresponding one of the concave portions 76 covers the pin 73b, and extend from the entrance surface 74 toward the light guiding direction. The pin 73b projects downward from the corresponding one of the concave portions 76. In the entrance surface 74, a thickness t2 between the upper surface 71a and the concave portions 76 is smaller, by about 0.1 to 0.2 mm, than a thickness t1 of portions of the light guide 71 in which the concave portions 76 are not formed. In other words, in a plane X parallel to the main scanning direction, the thickness of a portion of the light guide portion 71, in which each of the concave portions 76 is formed, is smaller than the thickness of a portion of the light guide portion 71, in which the concave portions 76 are not formed. Here, the thickness of the portion of the light guide portion 71, in which each of the concave portions 76 is formed, is a distance between the concave portions 76 and the upper surface 71a (that is, a distance between the upper surface 71a and the lower surface 71b in a portion where each of the concave portions 76 is formed). On the other hand, the thickness of the portion of the light guide portion 71, in which the concave portion 76 are not formed, is a distance between the upper surface 71a and the lower surface 71b in a portion where the concave portions 76 are not formed. That is, the corresponding one of the concave portions 76 is formed in a portion of the light guide portion 71, which includes the pin 73b, so that the portion is formed thinner than the other portion.

Also in other words, in a plane parallel to the arrangement direction, the thickness t2 is a distance between the upper surface 71a and the lower surface 71b (where one of the concave portions 76 is formed) at a position of a portion which covers the pin 73b in the arrangement direction. The thickness t2 is smaller than the thickness t1 between the upper surface 71a and the lower surface 71b (where the concave portions 76 are not formed) at a position of a portion which does not cover the pin 73b. The relationship between the thickness t1 and the thickness t2 may not be satisfied in all planes parallel to the arrangement direction. As described later, the present embodiment is applicable as long as the number of reflections of light in an area of the light guide 70, in which the pin 73b is formed, is greater than the number of reflections of light in an area of the light guide 70, in which the pin 73b is not formed.

FIGS. 8A to 8D are schematic diagrams of the light guide 70. FIG. 8A is a cross-sectional view of a portion of the light guide 70 in which the pin 73b and the corresponding one the concave portions 76 are not formed. FIG. 8B is a cross-sectional view of a portion of the light guide 70 in which the pin 73b and the corresponding one of the concave portions 76 are formed. FIG. 8C is an enlarged view illustrating a broken line portion of FIG. 8A. FIG. 8D is an enlarged view illustrating a broken line portion of FIG. 8B. In FIGS. 8A to 8D, the pin 73b is omitted. As illustrated in FIG. 8A, light L1 and L2 having entered the light guide 70 through the entrance surface 74 reflect off the upper surface 71a and the lower surface 71b, and travel toward the deflection surface 72a of the deflection portion 72.

Here, how the light travels in the light guide portion 71 of the light guide 70 will be described in detail. The light emitted from the LEDs 61, which serve as point sources, enters the light guide portion 71 in a state where the light is diffused. That is, light LC travels in a center direction in its directivity and enters the light guide portion 71, light L1 and L2 are diffused in directions different from the direction of the light LC, and enters the light guide portion 71. The light L1 and L2 travel toward the deflection surface 72a while reflected by the upper surface 71a and the lower surface 71b. In the light guide portion 71, because the upper surface 71a and the lower surface 71b are formed to constitute a wedge shape, the light L1 and L2 change their angles so as to be parallel to the light LC, every time the light L1 and L2 reflect off the upper surface 71a and the lower surface 71b. In addition, the angle of the deflection surface 72a with respect to the lower surface 71b is set so that the light LC is totally reflected by the deflection surface 72a.

In a portion where the pins 73a, 73b, and 73c, and the concave portions 76 are not formed, the light does not leak from the pins 73a, 73b, and 73c as a matter of course. However, because the portion of the light guide portion 71 is thick, the light reflects, less often, off the upper surface 71a and the lower surface 71b. The light L1 and L2, which reflects, less often, off the upper surface 71a and the lower surface 71b, has a larger angle with respect to the light LC and a smaller incident angle on the deflection surface 72a. For example, an incident angle θ1 of the light L1 on the deflection surface 72a is smaller than a critical angle. In this case, the light L1 is not totally reflected by the deflection surface 72a, and part of the light L1 leaks to the outside of the deflection portion 72.

On the other hand, as illustrated in FIG. 8B, the light L1 and L2 having entered the light guide 70 through the entrance surface 74 reflect off the upper surface 71a and the concave portions 76, and travel toward the deflection surface 72a of the deflection portion 72. In a portion where the pins 73a, 73b, and 73c, and the concave portions 76 are formed, the light slightly leaks from the pins 73a, 73b, and 73c. However, because the portion of the light guide portion 71 is thin, the light reflects, more often, off the upper surface 71a and the concave portions 76. For example, as illustrated in FIG. 8C, light L3 reflects off a portion, one time, where the pin 73b and a corresponding one of the concave portions 76 are not formed. On the other hand, as illustrated in FIG. 8D, the light L3 reflects off a portion, two times, where the pin 73b and the corresponding one of the concave portions 76 are formed. The light L1 and L2, which reflect, more often, off the upper surface 71a and the lower surface 71b, has a smaller angle with respect to the light LC and a larger incident angle on the deflection surface 72a. For example, an incident angle θ2 of the light L1 on the deflection surface 72a is larger than a critical angle. In this case, the light L1 is totally reflected by the deflection surface 72a, and the light L1 does not leak to the outside of the deflection portion 72.

Figure 9:
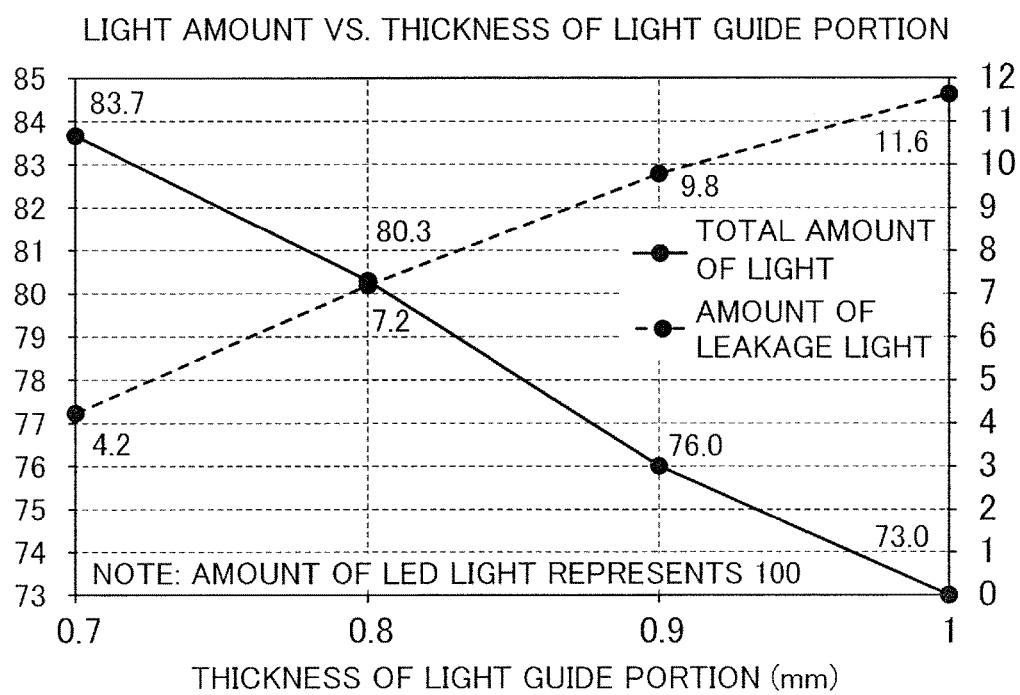
FIG. 9 is a graph illustrating a simulation result on a relationship between the thickness of a light guide portion and the amount of light having reached a document.

FIG. 9 is a graph illustrating a simulation result on a relationship between the thickness of the light guide portion 71 and the amount of light having reached a document. This graph indicates that a smaller thickness of the light guide portion 71 increases the amount of light which reaches a document. In FIG. 9, the term "amount of leakage light" refers to the amount of light which does not totally reflect off the deflection portion 72 and leaks to the outside of the light guide 70, the term "total amount of light" refers to the amount of light which reaches the document surface from the deflection surface 72a. Here, the total amount of light plus the amount of leakage light is not equal to 100. This is because some of the light is absorbed in the light guide 70.

The relationship between the amount of leakage light and the total amount of light can be determined by using optical simulation, and thus the thickness of the light guide portion 71 of the light guide 70 can be calculated by using the optical simulation and the loss of leakage light from the pins 73a, 73b, and 73c.

In addition, the area including the pins 73a through 73c and formed to be thinner can also be determined by using optical simulation. However, because the light guide 70 is commonly injection-molded by using resin such as acrylic resin, the fluidity of the resin will decrease in the molding if the area of the concave portions 76 is too increased. The decrease in the fluidity easily causes defective molding, such as warpage or defective filling of molding. As countermeasures to this, in the present embodiment, the area of the concave portions 76 is minimized in consideration of a spread angle of the light from each of the LEDs 61. Specifically, the area of the concave portions 76 is calculated to cover a range corresponding to a spread angle of one or two LEDs 61 nearest to the pin 73a, 73b, or 73c.

As described above, in the present embodiment, the concave portions 76 are formed to cover the pins 73a, 73b, and 73c, so that portions of the light guide portion are formed thinner than the other portion. This compensates the leakage light from the pins 73a, 73b, and 73c, by reducing the leakage light from the deflection portion 72, to improve the uneven distribution in illumination in the main scanning direction. That is, the present embodiment compensates the leakage light from the projection portions 73a, 73b, and 73c by increasing the amount of light reflected by the deflection portion 72, and improves the uneven distribution in illumination on the document surface in the main scanning direction. Furthermore, because the projection portions 73a, 73b, and 73c and the concave portions 76 can be formed regardless of positions of the light sources 61, flexibility of arranging the light sources 61 and projection portions 73a, 73b, and 73c can be increased.

In addition, because the pins 73a, 73b, and 73c can be disposed within a portion of the light guide 70 corresponding to the width R (see FIG. 7) of the document D, the light guide 70 can be shortened in the main scanning direction. In addition, because the pins 73a, 73b, and 73c and the concave portions 76 can be arranged, as desired, regardless of positions of the LEDs 61, flexibility of arranging the LEDs 61 and pins 73a, 73b, and 73c can be increased. Moreover, the number of the LEDs 61 is not limited to a specific number.

Figure 10A:
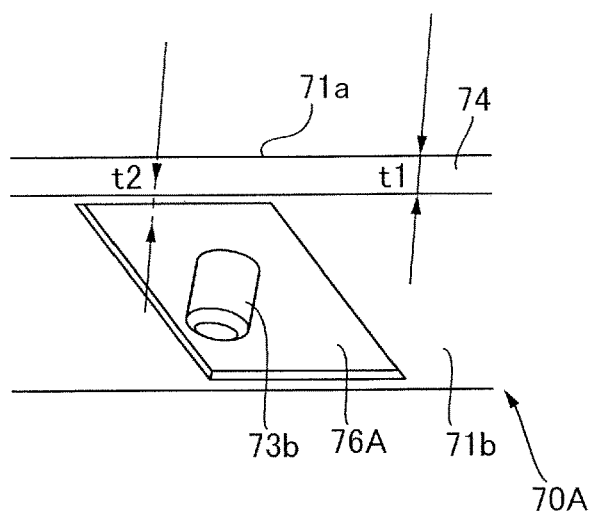
FIG. 10A is a perspective view illustrating a light guide which is a modification 1.
Figure 10B:
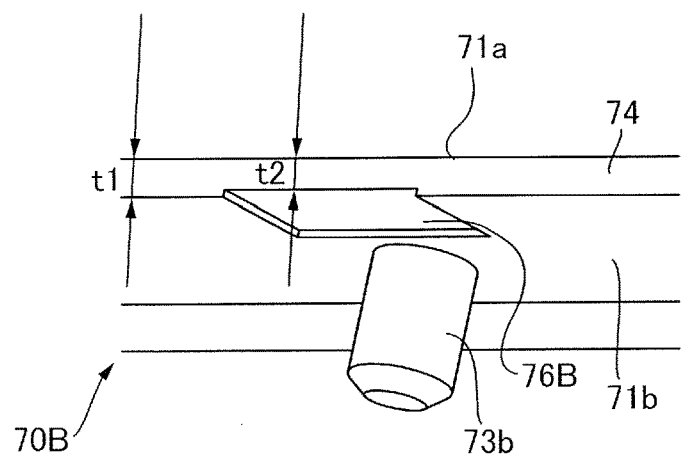
FIG. 10B is a perspective view illustrating a light guide which is a modification 2.
Figure 10C:
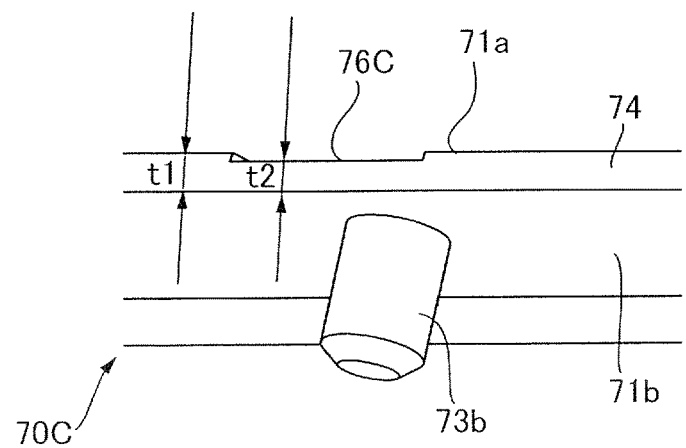
FIG. 10C is a perspective view illustrating a light guide which is a modification 3.

FIGS. 10A to 10C illustrate modifications of the light guide of the present embodiment. FIG. 10A is a perspective view of a light guide 70A which is a modification 1. FIG. 10B is a perspective view of a light guide 70B which is a modification 2. FIG. 10C is a perspective view of a light guide 70C which is a modification 3.

As illustrated in FIG. 10A, the light guide 70A that is the modification 1 is provided with concave portions 76A. The concave portions 76A are formed not from the entrance surface 74, but from a predetermined position downstream of the entrance surface 74 in the light guiding direction. Thus, the thickness of the entrance surface 74 is uniform in the main scanning direction. As illustrated in FIG. 10B, the light guide 70B that is the modification 2 is provided with concave portions 76B. The concave portions 76B are formed such that the pin 73b is out of a corresponding one of the concave portions 76B in the light guiding direction. As illustrated in FIG. 10C, the light guide 70C that is the modification 3 is provided with concave portions 76C. The concave portions 76C are formed not in the lower surface 71b, but in the upper surface 71a. The concave portions may be formed in both the upper surface 71a and the lower surface 71b. That is, the concave portions are applicable as long as one of the upper surface 71a and the lower surface 71b is formed closer to the other in the concave portions, or both of them are formed closer to each other in the concave portions.

Even in the modifications 1 to 3, the same effects as those of the above-described embodiment can be produced. A length of the concave portions in the main scanning direction and a length of the concave portions in the light guiding direction are not limited to specific values, and may be determined as appropriate. In another modification, the pins 73a, 73b, and 73c may project from the upper surface 71a. The arrangements of the concave portions in the modifications 1 to 3 may also be used in a later-described second embodiment. In addition, the wedge shape may not be formed by all of the upper surface 71a and all of the lower surface 71b. That is, each of the concave portions in one surface and a portion of the other surface which completely overlaps each of the concave portions may form a wedge shape, and the other portion of the one surface and the other portion of the other surface may be parallel to each other, for example.

Second Embodiment

Next, a second embodiment of the present invention will be described. In the second embodiment, slot portions 81 to 85 are used instead of the pins 73a, 73b, and 73c of the first embodiment. Thus, the same components as those of the first embodiment are not illustrated in the drawings, or described with the same symbols given to the drawings.

Figure 11A:
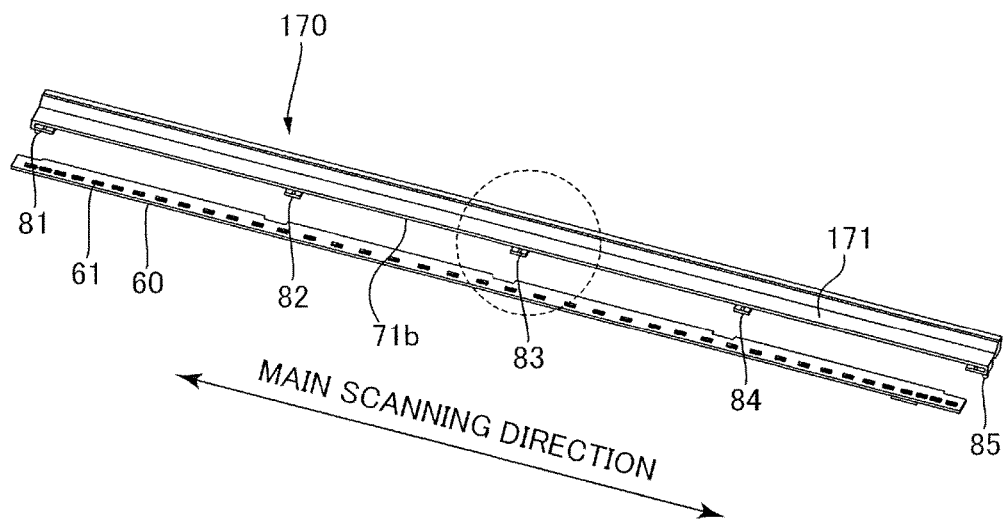
FIG. 11A is a perspective view illustrating a light guide of a second embodiment.

As illustrated in FIG. 11A, a light guide 170 of the second embodiment includes the plurality of (five in this embodiment) slot portions (projection portions and holding portions) 81, 82, 83, 84, and 85 which project from the lower surface 71b. Hereinafter, only the slot portion and its surrounding will be described, and the description of the other slot portions 81, 82, 84, and 85, and their surroundings will be omitted.

Figure 11B:
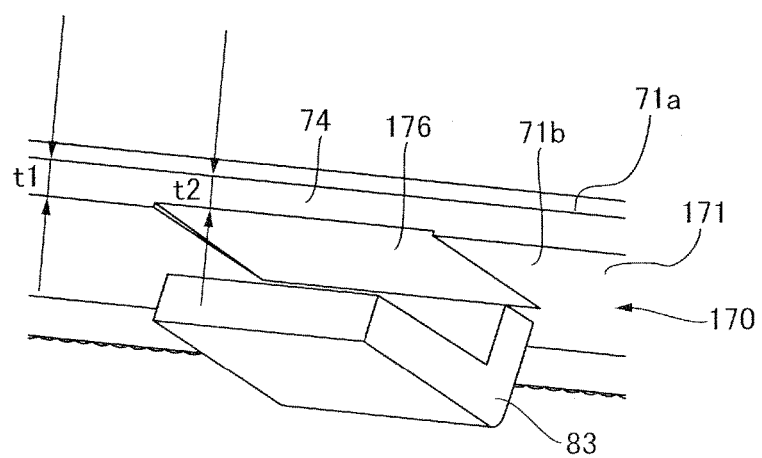
FIG. 11B is an enlarged perspective view of a slot portion and a concave portion.

As illustrated in FIG. 11B, concave portions 176 are formed in the lower surface 71b. The concave portions 176 are formed closer to the upper surface 71a than the other portion of the lower surface 71b. The concave portions 176 are arranged in the main scanning direction such that one of the concave portions 176 covers the slot portion 83, and extend from the entrance surface 74 toward the light guiding direction. The slot portion 83 projects downward from the lower surface 71b, at a position located downstream of the concave portion 176 in the light guiding direction. The slot portion 83 has a substantially L-shaped cross section, and holds the LED board 60, with the LED board 60 being sandwiched between the slot portion 83 and the lower surface 71b.

In the entrance surface 74, a thickness t2 between the upper surface 71a and one of the concave portions 176 is smaller, by about 0.1 to 0.2 mm, than a thickness t1 of the light guide portion 171 where the concave portions 176 are not formed. That is, the concave portions 176 are formed in portions of the light guide portion 171, one of which includes the slot portion 83, so that the portions are formed thinner than the other portion of the light guide portion 171.

In the case where the slot portion 83 having such a form is molded with an injection-molding mold, the mold typically has a slide mold structure. In the present embodiment, the concave portions 176 are formed by using a mold splitting which is a slide piece, and by forming a step of about 0.1 to 0.2 mm in a portion of the slide piece, used to form the slot portion 83.

As described above, the present embodiment also compensates the leakage light from the slot portions 81 to 85, by reducing the leakage light from the deflection portion 72, to improve the uneven distribution in illumination in the main scanning direction. In addition, in the present embodiment, the slot portions 81 to 85 and the concave portions 176 can be arranged, as desired, regardless of the arrangement of the LEDs 61.

Figure 12:
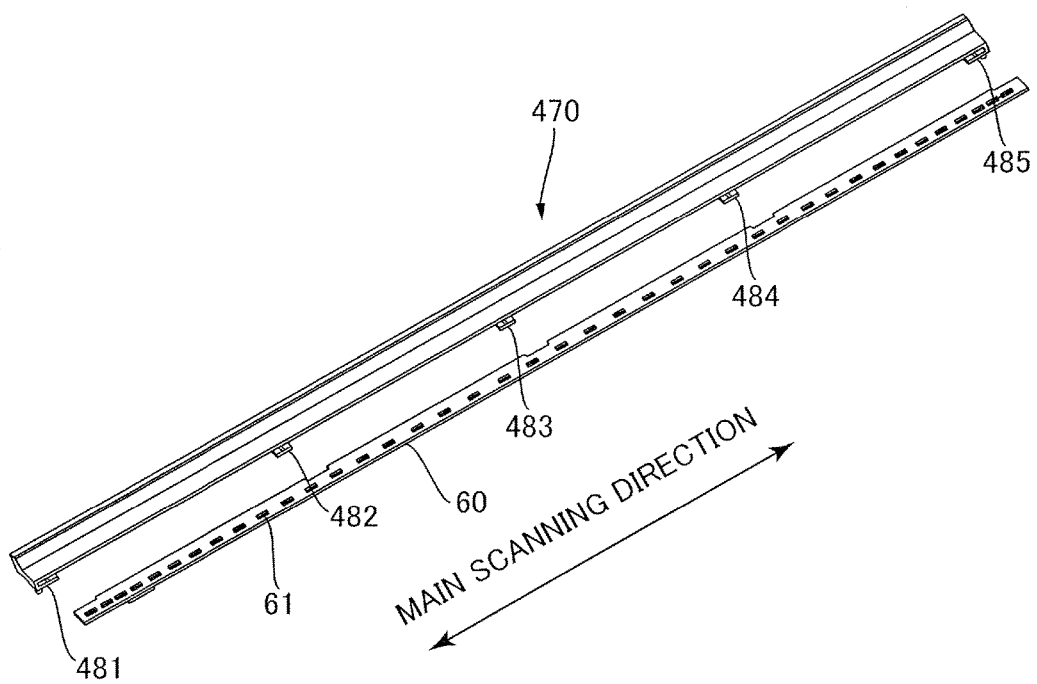
FIG. 12 is a perspective view of a light guide which is a comparative example 3.

In contrast, as illustrated in FIG. 12, a light guide 470 which is a comparative example 3 fails to have the concave portions 176. In this case, if slot portions 481 to 485 are each disposed in a portion which is between adjacent LEDs 61 and has less light flux from the LEDs 61, the leakage light from the slot portions 481 to 485 can be minimized. However, if the plurality of slot portions 481 to 485 are wide and an interval of the plurality of LEDs is short, the plurality of slot portions 481 to 485 cannot be disposed, as described above.

In the present embodiment, as illustrated in FIGS. 11A and 11B, the concave portions 176 are formed so as to cover the slot portions 81 to 85 in the main scanning direction so that the slot portions 81 to 85 can be arranged regardless of the arrangement of the LEDs 61.

The shape and the size of the pins 73a, 73b, and 73c of the first embodiment and the slot portions 81 to 85 of the second embodiment are not limited to a specific shape and a specific size. For example, the cross section of the pins 73a, 73b, and 73c may not be circular, and may be rectangular or polygonal.

Also, although the description has been made using the electrophotographic printer 100 in any of the embodiments describe above, the present invention is not limited to this. For example, the present invention may also be applied to an ink-jet image forming apparatus that forms images on sheets by injecting ink from its nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-201923, filed Oct. 13, 2016, which is hereby incorporated by reference wherein in its entirety.

What is claimed is:

1. An image reading apparatus comprising:
a board on which a plurality of light sources are arranged;
a light guide comprising:
a light guide portion configured to guide light emitted from the plurality of light sources, in an intersecting direction intersecting with an arrangement direction of the plurality of light sources, the light guide portion comprising a first surface and a second surface facing each other and configured to internally reflect the light from the light sources, the first surface and the second surface being formed such that a distance between the first surface and the second surface increases as the first surface and the second surface extend away from the light sources;
a deflection portion configured to deflect and emit light guided by the light guide portion; and
a projection portion projecting outward from the first surface; and
an image reading portion configured to perform photoelectric conversion on reflected light reflected by a sheet which has received the light emitted from the deflection portion of the light guide, and to read image information,
wherein the light guide portion, the deflection portion, and the projection portion are integrally formed,
wherein at least one of the first surface and the second surface includes a concave portion positioned to cover the projection portion in the arrangement direction; and
wherein, in a plane passing through the concave portion and parallel to the arrangement direction, a distance between the first surface and the second surface in a portion where the concave portion is formed is smaller than a distance between the first surface and the second surface in a portion where the concave portion is not formed.

2. The image reading apparatus according to claim 1, wherein the concave portion is formed in the first surface.

3. The image reading apparatus according to claim 1, wherein the projection portion projects outward from the concave portion.

4. The image reading apparatus according to claim 1, wherein the concave portion is formed in the second surface.

5. The image reading apparatus according to claim 1, further comprising a supporting portion configured to support the image reading portion,
wherein the projection portion comprises a pin for engaging with the supporting portion.

6. The image reading apparatus according to claim 1, wherein the projection portion comprises a holding portion configured to hold the board.

7. The image reading apparatus according to claim 1, wherein the light guide portion further comprises an entrance surface which is continuous with the first surface and the second surface, and though which the light from the plurality of light sources enters the light guide portion, and
the concave portion extends from the entrance surface toward the intersecting direction.

8. The image reading apparatus according to claim 1, wherein the projection portion is placed in a position different from a position in which the concave portion is positioned, in the intersecting direction.

9. An image reading apparatus comprising:
a board on which a plurality of light sources are arranged;
a light guide comprising:
a light guide portion configured to guide light emitted from the plurality of light sources, in an intersecting direction intersecting with an arrangement direction of the plurality of light sources, the light guide portion comprising a first surface and a second surface facing each other and configured to internally reflect the light from the light sources, the first surface and the second surface being formed such that a distance between the first surface and the second surface increases as the first surface and the second surface extend away from the light sources;
a deflection portion configured to deflect and emit light guided by the light guide portion; and
a projection portion projecting outward from the first surface; and
an image reading portion configured to perform photoelectric conversion on reflected light reflected by a sheet which has received the light emitted from the deflection portion of the light guide, and to read image information, wherein the light guide portion, the deflection portion, and the projection portion are integrally formed, wherein, in a plane parallel to the arrangement direction and orthogonal to the intersecting direction, a distance between the first surface and the second surface in a position of a portion which covers the projection portion in the arrangement direction is smaller than a distance between the first surface and the second surface in a position of a portion which does not cover the projection portion in the arrangement direction.

10. An image forming apparatus comprising:

an image reading apparatus; and an image forming portion configured to form an image on a sheet in accordance with image information data that is read by the image reading apparatus, wherein the image reading apparatus comprises:
- a board on which a plurality of light sources are arranged;
- a light guide comprising:
    - a light guide portion configured to guide light emitted from the plurality of light sources, in an intersecting direction intersecting with an arrangement direction of the plurality of light sources, the light guide portion comprising a first surface and a second surface facing each other and configured to internally reflect the light from the light sources, the first surface and the second surface being formed such that a distance between the first surface and the second surface increases as the first surface and the second surface extend away from the light sources;
    - a deflection portion configured to deflect and emit light guided by the light guide portion; and
    - a projection portion projecting outward from the first surface; and
- an image reading portion configured to perform photoelectric conversion on reflected light reflected by a sheet which has received the light emitted from the deflection portion of the light guide, and to read image information, wherein the light guide portion, the deflection portion, and the projection portion are integrally formed, wherein at least one of the first surface and the second surface includes a concave portion positioned to cover the projection portion in the arrangement direction, and wherein, in a plane passing through the concave portion and parallel to the arrangement direction, a distance between the first surface and the second surface in a portion where the concave portion is formed is smaller than a distance between the first surface and the second surface in a portion where the concave portion is not formed.

* * * * *